US011683311B2

(12) United States Patent
Goel (10) Patent No.: US 11,683,311 B2
(45) Date of Patent: Jun. 20, 2023

(54) SYSTEMS AND METHODS FOR RUNNING APPLICATIONS ON A MULTI-TENANT CONTAINER PLATFORM

(71) Applicant: Veritas Technologies LLC, Mountain View, CA (US)

(72) Inventor: Vikas Goel, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 488 days.

(21) Appl. No.: 15/908,854

(22) Filed: Mar. 1, 2018

(65) Prior Publication Data
US 2019/0273744 A1 Sep. 5, 2019

(51) Int. Cl.
*G06F 21/53* (2013.01)
*H04L 9/40* (2022.01)
(Continued)

(52) U.S. Cl.
CPC ............ *H04L 63/101* (2013.01); *G06F 9/468* (2013.01); *G06F 21/53* (2013.01); *G06F 21/629* (2013.01); *G06F 21/6218* (2013.01)

(58) Field of Classification Search
CPC ....... H04L 29/06; H04L 63/101; G06F 21/62; G06F 21/6218
See application file for complete search history.

(56) References Cited

U.S. PATENT DOCUMENTS 9,729,579 B1 * 8/2017 Marino ................. H04L 63/101
10,303,879 B1 * 5/2019 Potlapally ............... G06F 21/57
(Continued)

FOREIGN PATENT DOCUMENTS

CN 104838630 A 8/2015
CN 104982005 A 10/2015
(Continued)

OTHER PUBLICATIONS

A Not Very Short Introduction to Docker; https://blog.jayway.com/2015/03/21/a-not-very-short-introduction-to-docker/, as accessed Feb. 23, 2017 (Mar. 21, 2015); jayway.
(Continued)

*Primary Examiner* — Trang T Doan
*Assistant Examiner* — Vladimir I Gavrilenko
(74) *Attorney, Agent, or Firm* — Patent Law Works LLP (57) ABSTRACT

The disclosed computer-implemented method for running applications on a multi-tenant container platform may include (1) receiving, at a host administrator service on a container host computing device and via a host administrator service socket handle, a request for a privileged operation from an application running in a non-privileged container, (2) performing, based on a user identifier of the application, a security check of a user associated with the application, (3) comparing, when the security check results in approval, a process identifier of the requested privileged operation against a whitelist of permitted operations to determine the requested privileged operation is permissible, and (4) initiating running, when the requested privileged operation is permissible, the requested privileged operation. Various other methods, systems, and computer-readable media are also disclosed.

14 Claims, 4 Drawing Sheets

(51) Int. Cl.
  *G06F 21/62*   (2013.01)
  *G06F 9/46*   (2006.01)

(56) References Cited

U.S. PATENT DOCUMENTS

| | | | |
|---|---|---|---|
| 10,348,767 B1* | 7/2019 | Lee | H04L 63/1441 |
| 2010/0306775 A1 | 12/2010 | Appiah | |
| 2016/0134616 A1* | 5/2016 | Koushik | G06F 21/335 726/9 |
| 2017/0373940 A1* | 12/2017 | Shahab | H04L 41/12 |
| 2018/0025152 A1* | 1/2018 | Ben Ali | G06F 21/6281 726/22 |
| 2018/0075250 A1* | 3/2018 | Chasman | G06F 21/31 |
| 2018/0165785 A1* | 6/2018 | Kurtz | G06T 1/20 |

FOREIGN PATENT DOCUMENTS

| | | |
|---|---|---|
| EP | 1643343 A2 | 4/2006 |
| JP | 2012033189 A | 2/2012 |
| WO | 2019/168957 A1 | 9/2019 |

OTHER PUBLICATIONS

Advanced Analytics Products; http://www.sas.com/en_us/software/analytics.html#view-all-products; as accessed Jan. 31, 2017.
Apache Mesos, http://mesos.apache.org, last accessed Jan. 25, 2017.
Apache Nifi for Docker, https://github.com/apiri/dockerfile-apache-nifi, last accessed Jan. 25, 2017.
Attach a volume to a container while it is running; http://jpetazzo.github.io/2015/01/13/docker-mount-dynamic-volumes/, as accessed Feb. 23, 2017 (Jan. 13, 2015); Github.
AWS Lambda, https://aws.amazon.com/lambda/, last accessed Jan. 25, 2017.
Clustered file system; https://en.wikipedia.org/wiki/Clustered_file_system; as accessed Jan. 30, 2017.
Coho Data, https://www.cohodata.com/intel, last accessed Jan. 25, 2017.
Container Cluster; https://cloud.google.com/containerengine/ docs/clusters/#what is a container cluster; as accessed Jan. 31, 2017.
Containerized Cloud Analytics—SAS Analytics for Containers; http://www.sas.com/en_us/software/analytics-for-containers.html; as accessed Jan. 31, 2017.
Docker—Data Volumes and Data Containers (4); http://www.tricksofthetrades.net/2016/03/14/docker-data-volumes/, as accessed Feb. 23, 2017 (Mar. 14, 2016); Tricks of the Trades.
Docker container support, last accessed Jan. 25, 2017.
Docker ETL Rest server github, https://github.com/bmamlin/docker-etl-rest-server, last accessed Jan. 25, 2017.
Docker mounting volumes on host; http://stackoverflow.com/questions/25311613/docker-mounting-volumes-on-host, as accessed Feb. 23, 2017 (Aug. 14, 2014); stackoverflow.
Docker Nifi github, https://github.com/jdye64/docker-nifi, last accessed Jan. 25, 2017.
Docker Swarm product overview, https://www.docker.com/products/docker-swarm, ast accessed Feb. 28, 2017.
Dray-Docker Workflow Engine, http://dray.it/, last accessed Jan. 25, 2017.
Extract, transform, load; https://en.wikipedia.org/wiki/Extract,_transform,_load, as accessed Feb. 14, 2017 (Aug. 15, 2004) Wikipedia.
Jenkins and Docker, https://www.cloudbees.com/continuous-delivery/jenkins-docker, last accessed Jan. 25, 2017.
Kubernetes Basics, https://kubernetes.io/docs/tutorials/kubernetes-basics/, last accessed Feb. 28, 2017.
Iron.io, https://www.iron.io/, last accessed Jan. 25, 2017.
Manage data in containers; https://docs.docker.com/engine/tutorials/dockervolumes/#/backup-restore-ormigrate-data-volumes, as accessed Feb. 23, 2017 (Sep. 3, 2016); Docker.
Mesos/Chronos github, https://github.com/mesos/chronos, last accessed Jan. 25, 2017.
Object Storage; https://en.wikipedia.org/wiki/Object storage; as accessed Jan. 30, 2017.
Operating-system-level virtualization; https://en.wikipedia.org/wiki/Operating-system-level_virtualization; as accessed Jan. 28, 2017.
Pachyderm.io, https://www.pachyderm.io/, last accessed Jan. 25, 2017.
Platform as a Service; https://en.wikipedia.org/wiki/Platform_as_a_service; as accessed Jan. 28, 2017.
Plugins_volume.md; https://github.com/docker /docker/blob/master/ docs/ extend/plugi ns_ volume.md, as accessed on Feb. 14, 2017.
Real-Time Data Analysis with Kubernetes, Red is, and BigQuery; https://cloud.google.com/solutions/real-time/kubernetes-redis-bigquery; as accessed Jan. 28, 2017.
Rodeo Basics; http://rodeo.yhat.com/docs/, as accessed Feb. 14, 2017 (Nov. 14, 2015); Rodeo.
Syncsort ETL, last accessed Jan. 25, 2017.
Talend and Docker, last accessed Jan. 25, 2017.
Understand images, containers, and storage drivers; https://docs.docker.com/engine/userguide/storagedriver/imagesandcontainers/, as accessed Feb. 23, 2017 (Nov. 7, 2015); Docker.
Understanding Volumes in Docker; http://container solutions.com/understanding-volumes-docker/, as accessed Feb. 23, 2017 (Jul. 6, 2015); Container Solutions Amsterdam.
Use data volume containers; https://getcarina.com/docs/tutorials/data volumecontainers/, as accessed Feb. 23, 2017 (Oct. 23, 2015); Rackspace.
What is Docker; http://searchitoperations.techtarget.com/definition/Docker; as accessed Jan. 28, 2017.
What is Docker?, https://www.docker.com/what-docker, last accessed Jan. 25, 2017.
What is Scale out Storage; http://whatis.techtarget.com/definition/scale-out-storage; as accessed Jan. 28, 2017.
What is the differences between Data Scientist Workbench and Knowledge Anyhow Workbench; http://support.datascientistworkbench.com/knowledgebase/articles/738753-what-isthe-differences-between-data-scientist-war, as accessed Feb. 14, 2017 (Jan. 13, 2016); Big Data University.
Wikipedia; Operating-system-level virtualization; https://en.wikipedia.org/wiki/Operating-system-level_virtualization, as accessed on Feb. 14, 2017.
Ryan Schroeder et al.; Systems and Methods for Automatically Linking Data Analytics to Storage; U.S. Appl. No. 15/428,134, filed Feb. 8, 2017.
Ryan Schroeder et al.; Systems and Methods for Performing Storage Location Virtualization; U.S. Appl. No. 15/432,614, filed Feb. 14, 2017.
International Search Report and Written Opinion received for PCT Application Serial No. PCT/US2019/019798 dated May 15, 2019, 14 pages.
Japanese Office Action dated Aug. 31, 2021 for patent application No. 2020-543381, 5 pgs.
European Office Action dated Aug. 10, 2022 for patent application No. 19710896.2, 12 pgs.
Office Action for Chinese Application No. 201980010986.1, issued by China National Intellectual Property Administration dated May 9, 2023, 18 pgs.

* cited by examiner

SYSTEMS AND METHODS FOR RUNNING APPLICATIONS ON A MULTI-TENANT CONTAINER PLATFORM

BACKGROUND

In the past, large-scale computing projects were limited to individuals and enterprises that owned large physical data centers with towering racks of computers. Now, distributed computing allows anyone with resources to buy server space and run as many instances of their preferred computing device as desired. Further efficiency improvements have been introduced with the creation of application containers that allow administrators to run applications without requiring the resources necessary to simulate an entire virtualized operating system for each virtualized application. Containers may reduce processing requirements for each application, allowing a greater number of applications to be run on a shared host computing device. Containers may be used for anything from short-lived operations lasting minutes to long-lived operations lasting weeks or months, and may be configured to run a wide variety of applications in order to complete a wide variety of computing tasks.

The shared host computing device may be implemented with an architecture known as multi-tenancy, in which many different unrelated customers (i.e., tenants) may run multiple respective sets of application containers on the shared host computing device. While multi-tenancy beneficially provides economies of scale, undesirable effects may occur when the tenants' applications perform acts requiring system administrator capabilities of the shared host computing device, such as acts requiring additional Linux capabilities (e.g., CAP_SYS_ADMIN) and/or requiring running in privileged mode to gain access to resources of the shared host computing device. These acts may give the application containers access to host storage, host networking, and host computing resources. Thus, one tenant's application containers may gain access to other tenants' information and data, which may detrimentally affect the other tenants' operations by changing behavior of other tenants' applications. Methods to prevent these detrimental effects may include running the application containers in a non-privileged mode which disallows applications from performing the acts requiring the system administrator capabilities and/or requiring using the privileged mode, which in turn detrimentally affects application performance.

The instant disclosure, therefore, identifies and addresses a need for systems and methods for running applications on a multi-tenant container platform.

SUMMARY

As will be described in greater detail below, the instant disclosure describes various systems and methods for running applications on a multi-tenant container platform by selectively mediating required privileged operations of applications running on the multi-tenant container platform.

In one embodiment, a method for running applications on a multi-tenant container platform may include (1) receiving, at a host administrator service on a container host computing device and via a host administrator service socket handle, a request for a privileged operation from an application running in a non-privileged container, (2) performing, based on a user identifier of the application, a security check of a user associated with the application, (3) comparing, when the security check results in approval, a process identifier of the requested privileged operation against a whitelist of permitted operations to determine the requested privileged operation is permissible, and (4) initiating running, when the requested privileged operation is permissible, the requested privileged operation.

In examples, the method may include passing an interceptor, a container administrator program, and the host administrator service socket handle from a container host administrator service to the container at a time when the container is started. In embodiments, the method may include (1) receiving, at the interceptor, the request from the application, (2) performing, by the interceptor, a whitelist check of the request, (3) calling, by the interceptor when the whitelist check succeeds, the container administrator, (4) initiating, by the container administrator using the host administrator service socket handle, a connection between the container administrator and the host administrator service when conditions are met for the requested operation, and (5) sending the request with details of the requested operation to the host administrator service.

In one example, performing the security check further comprises issuing the security check results of approval when the user identifier indicates a root user. In embodiments, the method may include sending, when the requested privileged operation is successfully completed or rejected, a respective response (e.g., "success" or "failed") to the container administrator. In some examples, the method may include receiving, at the interceptor, a success response, and sending a notification to the application that the requested privileged operation is successfully completed. In further embodiments, the method may include displaying, on a user display, an error message when the requested privileged operation fails to successfully execute.

In one example, a system for running applications on a multi-tenant container platform may include several modules stored in memory, including (1) a receiving module, stored in the memory, that receives, at a host administrator service on a container host computing device and via a host administrator service socket handle, a request for a privileged operation from an application running in a non-privileged container, (2) a performing module, stored in the memory, that performs, based on a user identifier of the application, a security check of a user associated with the application, (3) a comparing module, stored in the memory, that compares, when the security check results in approval, a process identifier of the requested privileged operation against a whitelist of permitted operations to determine the requested privileged operation is permissible, (4) an initiating module, stored in the memory, that initiates running, when the requested privileged operation is permissible, the requested privileged operation. The system may also include at least one physical processor that executes the receiving module, the performing module, the comparing module, and the initiating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a host administrator service on a container host computing device and via a host administrator service socket handle, a request for a privileged operation from an application running in a non-privileged container, (2) perform, based on a user identifier of the application, a security check of a user associated with the application, (3) compare, when the security check results in approval, a process identifier of the requested privileged operation against a whitelist of permitted operations to determine the requested privileged operation is permissible, and (4) initiate running, when the requested privileged operation is permissible, the requested privileged operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for running applications on a multi-tenant container platform. In some examples, the systems and methods described herein may provide an ambassador-pattern-like extension to container implementation software (e.g., DOCKER) by adding application-specific functionality that mediates required privileged operations of applications such as mounting volumes and reduces security risks that result from privileged container models. This intermediation may enable safe multi-tenant application orchestration. In some examples, the systems and methods described herein may use of two levels of name-space virtualization, with container implementation software providing a primary level (at the kernel API level) and library interposition selectively handling system calls that require privilege and intermediation. This provides a control point between containers and container implementation software. In embodiments, the disclosed techniques may be utilized in connection with container hosts such as multi-tenant container platforms.

By doing so, the systems and methods described herein may improve the functioning of computing devices by enabling application containers to run in non-privileged mode without additional system administrator capabilities and to perform system administration operations in response to requests from applications for privileged operations. This enables applications to run at full capability, without acquiring root-equivalent privileges, in non-privileged containers on multi-tenant container platforms. The systems and methods described herein may also mitigate security risks associated with privileged multi-tenant containers. Further, the systems and methods described herein may improve the functioning of computing devices by removing requirements that containers must be restarted with privileged mode to perform system administration operations in response to requests from applications for privileged operations. Also, in examples, application container hosts may provide the disclosed features without requiring intervention or acts by other computing devices. In examples, from a perspective of applications, systems and methods described herein may appear transparent to applications. Moreover, the systems and methods described herein may extend capabilities of container implementation software, such as DOCKER, to provide application-specific functions.

Figure 1:
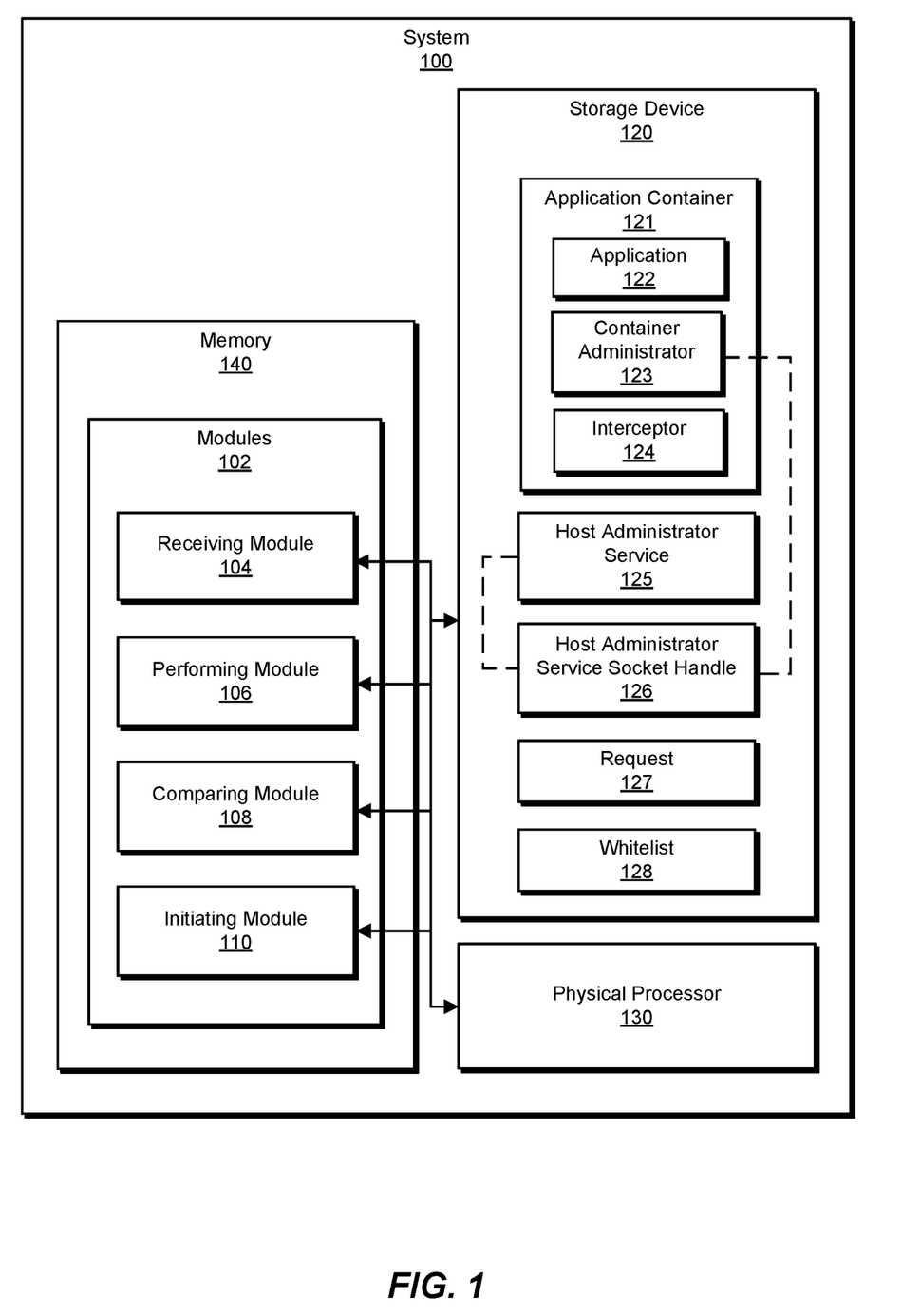
FIG. 1 is a block diagram of an example system for running applications on a multi-tenant container platform.
Figure 2:
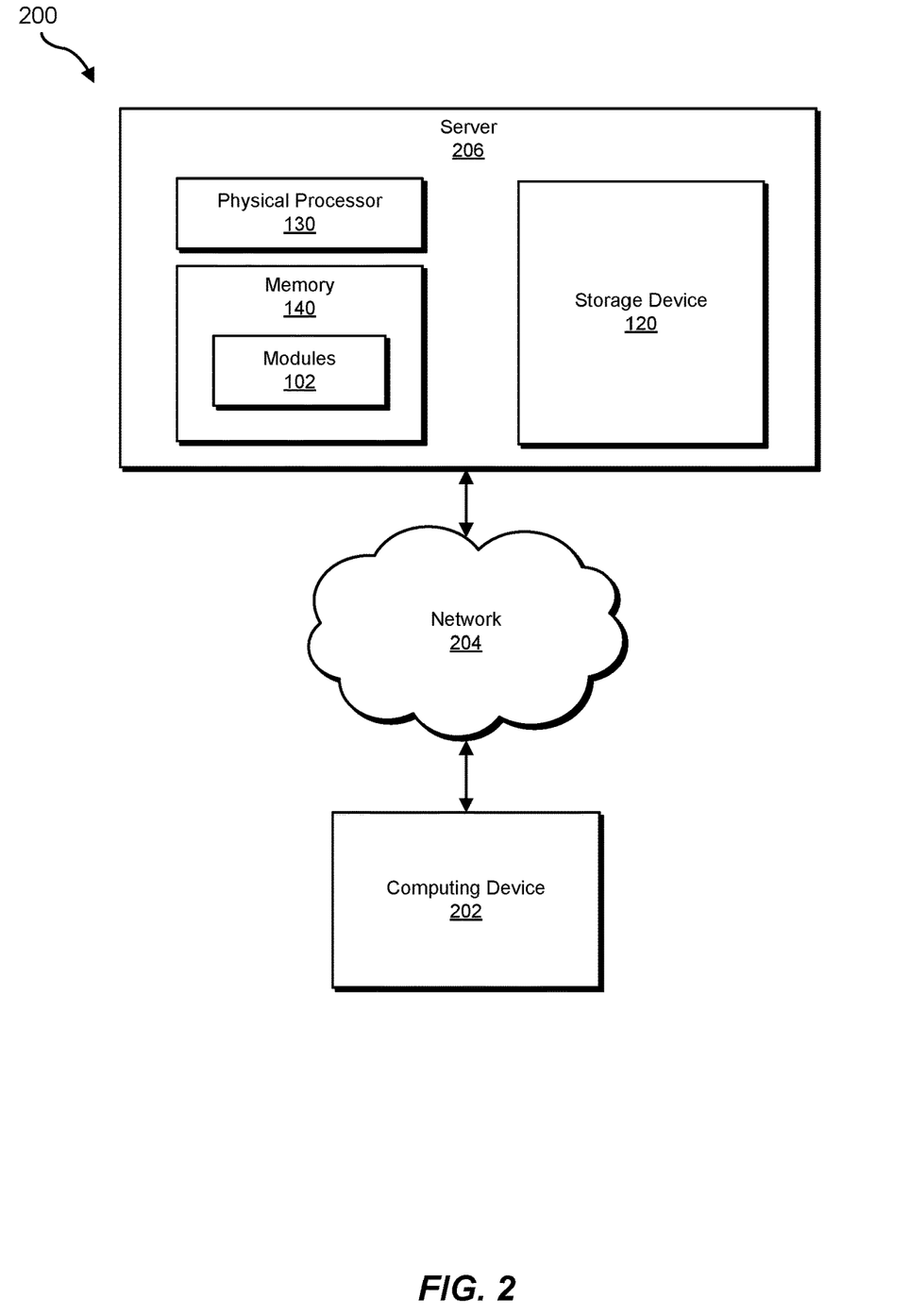
FIG. 2 is a block diagram of an additional example system for running applications on a multi-tenant container platform.
Figure 3:
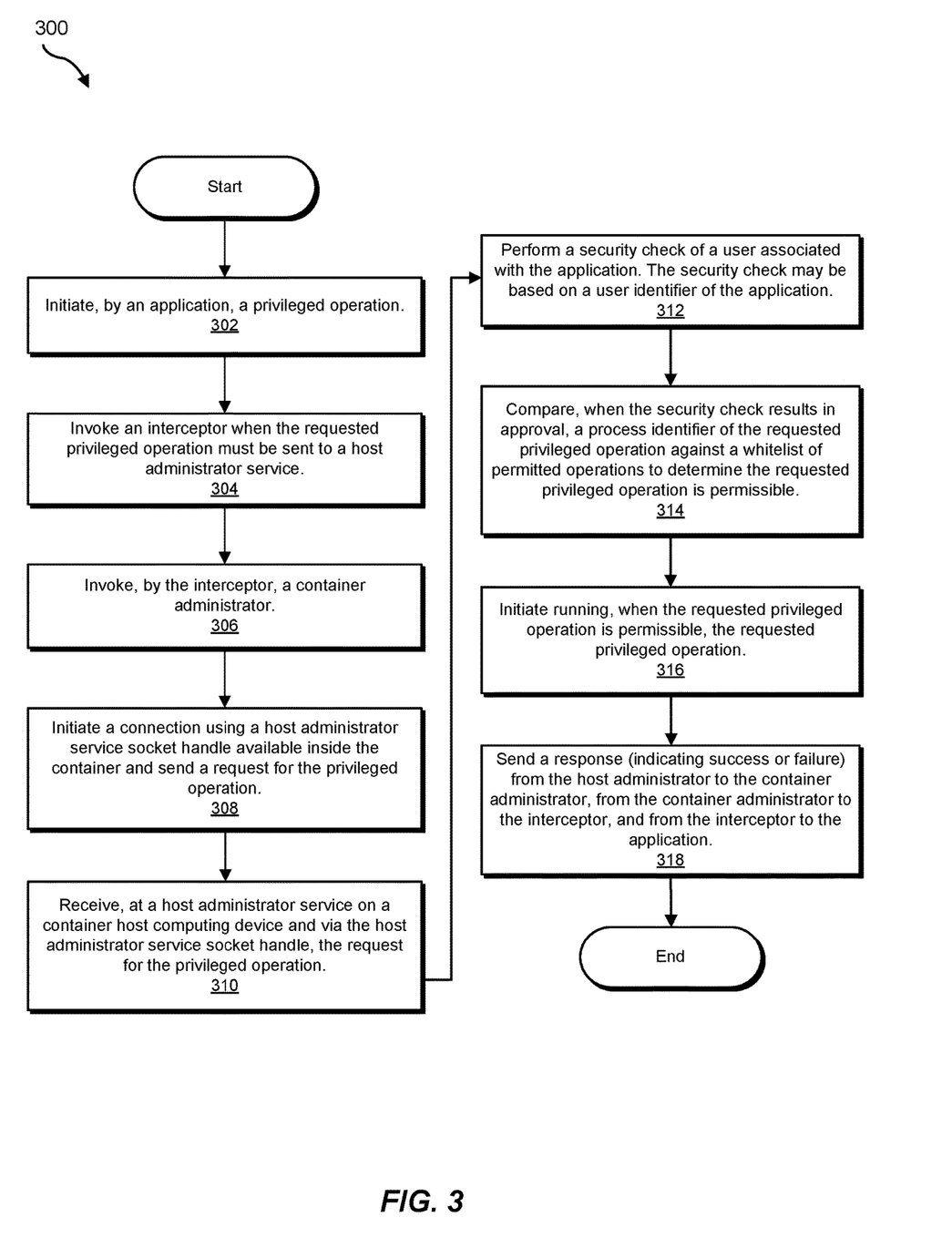
FIG. 3 is a flow diagram of an example method for running applications on a multi-tenant container platform.
Figure 4:
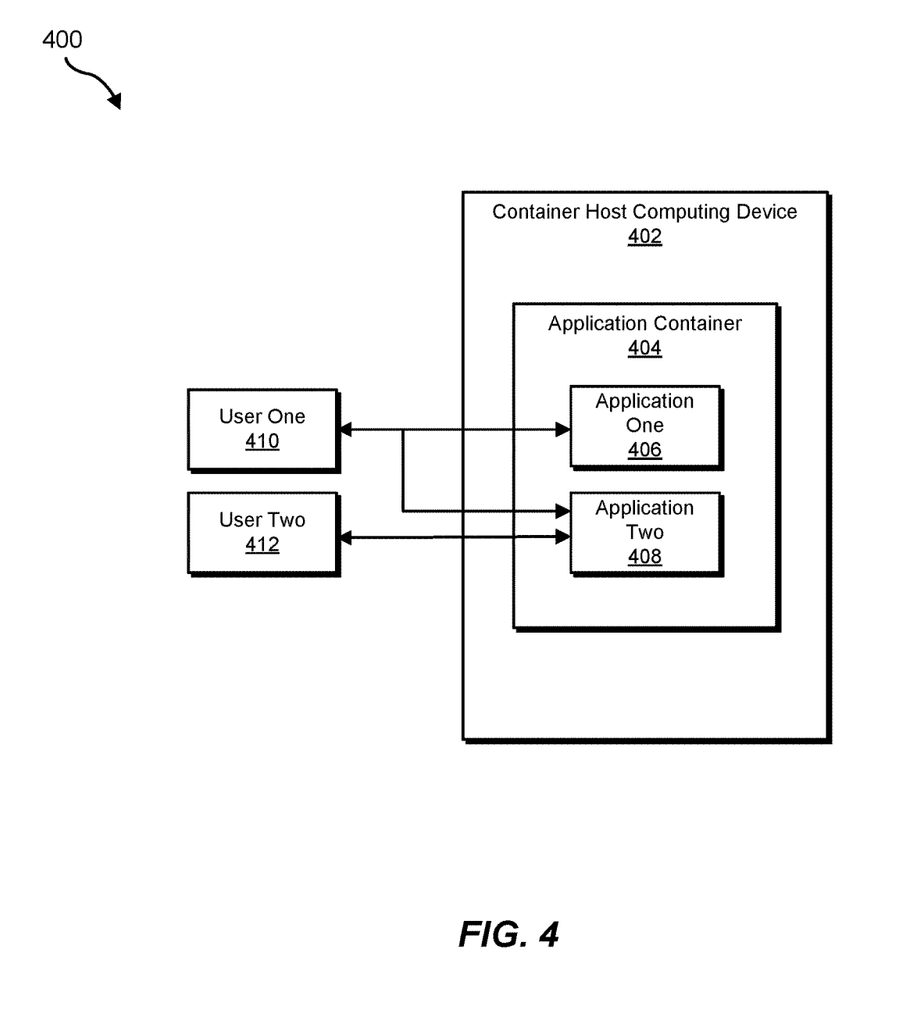
FIG. 4 is a block diagram of an example of a multi-tenant computing system.

The following will provide, with reference to FIGS. 1-2 and 4, detailed descriptions of example systems for running applications on a multi-tenant container platform. Detailed descriptions of corresponding computer-implemented methods will also be provided in connection with FIG. 3.

FIG. 1 is a block diagram of an example system 100 for running applications on a multi-tenant container platform. As illustrated in this figure, example system 100 may include one or more modules 102 for performing one or more tasks. As will be explained in greater detail below, modules 102 may include a receiving module 104, a performing module 106, a comparing module 108, and an initiating module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 206). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of application container 121, application 122, container administrator 123, interceptor 124, host administrator service 125, host administrator service socket handle 126, request 127, and/or whitelist 128. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Application container 121 generally represents any type or form of virtualization platform capable of hosting an application. Application 122 generally represents any type or form of executable code. Container administrator 123 generally represents any type or form of administration program capable of performing a system administration function within application container 121. Interceptor 124 may be a component part of container administrator 123 and generally represents any type or form of interceptor library capable of intercepting system administration operations by application 122 and sending request 127 to host administrator service 125. In examples, interceptor 124 may wait for client (e.g., application 122) connections and trap system administration operations initiated by application 122. Host administrator service 125 generally represents any type or form of administration program capable of implementing whitelist 128 of system administration operations that may be honored when requested by application 122. Example operations may include mounting NFS shares and/or mounting FUSE file systems. Host administrator service 125 may run on a container host such as system 100 and cater to container requests such as request 127. In examples, host administrator service 125 may be web, transmission control protocol (TCP), or Unix domain socket (UDS)-based. For example, host administrator service 125 may run as a UDS service with host administrator service socket handle 126 on system 100. Host administrator service socket handle 126 generally represents any type or form of reference referring to a socket for host administrator service 125. Host administrator service socket handle 126 may be available inside application container 121 for use by container administrator 123 to form a connection between host administrator service 125 and container administrator 123, as shown in FIG. 1 with dashed lines. Request 127 generally represents any type or form of request by application 122 for a privileged and/or system administration function, such as a root function, within application container 121. Whitelist 128 includes at least one permitted user, permitted privileged function, and/or permitted system administration function.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate running applications on a multi-tenant container platform. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

The term "application," as used herein, generally refers to any executable code that is capable of launching a process. In some embodiments, an application may be a piece of software. Additionally or alternatively, an application may be a script. In some examples, an application may be a standalone application. In other examples, an application may be a frontend for a larger system, such as an interface for a web application. In some examples, an application may include a collection of interoperating programs and/or executable objects. In one example, an application may be a backup, storage, and/or deduplication application.

The term "container," as used herein, generally refers to any type of virtual environment that does not include an entire operating system but does include enough computing resources to execute at least one process and/or application when supplemented by computing resources from an operating system of a host computing system. In some embodiments, the resources and/or processes within a container may be isolated from resources and/or processes outside the container. For example, a container may isolate user space of a deployment system from other software on the deployment system while being served by shared kernel space with the other software.

The term "user space," as used herein, generally refers to the portion of memory in a computing environment where application software executes. In some embodiments, user space may include libraries, graphics engines, device drivers for certain devices, and/or system daemons.

The term "kernel space," as used herein, generally refers to the portion of memory in a computing environment reserved for executing an operating system kernel, kernel extensions, and device drivers. In some embodiments, a container may execute only a single process and/or application, while in other embodiments, a container may execute multiple processes and/or applications. In some embodiments, a container may be a DOCKER container.

The term "application container," as used herein, generally refers to a container that stores and/or hosts an application. In some examples, an application container may also host bundled components for an application.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of server 206, enable server 206 to run applications on a multi-tenant container platform.

Computing device 202 generally represents any type or form of computing device capable of reading computer-executable instructions. In some examples, computing device 202 may represent computer running user-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of running applications on a multi-tenant container platform. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. In examples, server 206 may provide a cloud-computing computing environment that may facilitate multi-tenancy. In other words, modules described herein may configure a computing system (e.g., a server) to facilitate multi-tenancy for one or more of the functions described herein. For example, one or more of modules described herein may program server 206 to enable two or more clients (e.g., customers) to share application 122 that is running on server 206. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer. An example multi-tenant container platform is described in further detail with respect to FIG. 4.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for running applications on a multi-tenant container platform. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

In examples, method 300 may include passing interceptors, container administrator programs and host administrator service socket handles from container hosts to containers at times when the containers are started.

As illustrated in FIG. 3, at step 302 one or more of the systems described herein may initiate privileged operations by applications. The systems described herein may perform step 302 in a variety of ways. For example, application 122 in application container 121 (e.g., a non-privileged container) may initiate request 127 for a privileged operation.

As illustrated in FIG. 3, at step 304 one or more of the systems described herein may invoke interceptors when requested privileged operations must be sent to host administrator services. The systems described herein may perform step 304 in a variety of ways. For example, interceptor 124 may be invoked when request 127 must be sent to host administrator service 125.

As illustrated in FIG. 3, at step 306 one or more of the systems described herein may invoke, by the interceptors, container administrators. The systems described herein may perform step 306 in a variety of ways. For example, interceptor 124 may invoke container administrator 123.

As illustrated in FIG. 3, at step 308 one or more of the systems described herein may initiate connections using host administrator service socket handles available inside the containers and send requests for privileged operations. The systems described herein may perform step 308 in a variety of ways. For example, container administrator 123 may initiate a connection with host administrator service 125 using host administrator service socket handle 126 available inside application container 121 and send request 127 for the privileged operation.

As illustrated in FIG. 3, at step 310 one or more of the systems described herein may receive, at host administrator services on container host computing devices and via host administrator service socket handles, requests for privileged operations from applications running in non-privileged containers. The systems described herein may perform step 310 in a variety of ways. For example, receiving module 104 may, as part of server 206 in FIG. 2, receive, at host administrator service 125 on system 100 (a container host computing device) and via host administrator service socket handle 126, request 127 for a privileged operation from application 122 running in application container 121.

In additional examples, method 300 may include, on-demand, passing host administrator service socket handles from container hosts to containers. For example, server 206 in FIG. 2 may pass host administrator service socket handle 126 to application container 121.

In some embodiments, method 300 may include (1) receiving, at interceptors, requests from applications, (2) performing, by the interceptors, whitelist checks of requests, (3) calling, by the interceptors when the whitelist checks succeed, container administrators, (4) initiating, by container administrators, using host administrator service socket handles, connections between container administrators and host administrator services when conditions are met for the requested operations, and (5) sending requests with details of the requested operations to host administrator services. In some embodiments, server 206 in FIG. 2 may include interceptor 124 that receives request 127 from application 122 and performs a whitelist check of request 127 and calls container administrator module 123 when the whitelist check succeeds, as well as container administrator module 123 that both initiates a connection with host administrator service 125 using host administrator socket handle 126 when conditions are met for the requested operations and sends request 127 to host administrator service 125 with details of the operations. In further examples, interceptors may provide indications of anticipated function calls to other software modules (e.g., container administrators) to indicate points at which to resume operations.

As illustrated in FIG. 3, at step 312 one or more of the systems described herein may perform, based on user identifiers of applications, security checks of users associated with applications. The systems described herein may perform step 312 in a variety of ways. For example, performing module 106 may, as part of server 206 in FIG. 2, perform, based on a user identifier (UID) of application 122, a security check of a user associated with application 122. In examples, a UDS connection may be used to access UIDs and process identifiers (PIDs) of requested privileged operations.

In additional examples, performing security checks further comprises issuing security check results of approval when user identifiers indicate root users. In some embodiments, performing module 106 may, as part of server 206 in FIG. 2, issue security check results of approval when user identifiers indicate root users. In examples, performing module 126 declines request 127 if request 127 is not initiated by a root user and otherwise proceeds.

As illustrated in FIG. 3, at step 314 one or more of the systems described herein may compare, when security checks results in approvals, process identifiers of requested privileged operations against whitelists of permitted operations to determine requested privileged operations are permissible. The systems described herein may perform step 314 in a variety of ways. For example, comparing module 108 may, as part of server 206 in FIG. 2, compare, when the security check results in approval, a PID of a requested privileged operation in request 127 against whitelist 128 of permitted operations to determine the requested privileged operation in request 127 is permissible. In embodiments, comparing module 108 declines request 127 if a requested privileged operation in request 127 is not on whitelist 128, and otherwise proceeds. Further, target containers may be identified using PIDs.

As illustrated in FIG. 3, at step 316 one or more of the systems described herein may initiate running, when requested privileged operations are permissible, requested privileged operations (e.g., on shared host computing devices). The systems described herein may perform step 316 in a variety of ways. For example, initiating module 110 may, as part of server 206 in FIG. 2, initiate running, when requested privileged operation in request 127 is permissible, a requested privileged operation on server 206. For example, initiating module 110 may initiate mounting an NFS share in application container 121. In embodiments, initiating module 110 may use an nsenter command with application container 121 as a target to run a privileged operation (e.g., nsenter -m -u -i -n -p -t "${container_pid}" ${client_operation}).

In additional examples, method 300 may include sending, when requested privileged operations are successful or rejected, respective responses (e.g., "success" or "failed") to container administrators. In some embodiments, initiating module 110 sends, when requested privileged operation in request 127 is successfully completed or rejected, a respective response to container administrator module 123.

As illustrated in FIG. 3, at step 318 one or more of the systems described herein may send responses (indicating success or failure) from host administrators to container administrators, from container administrators to interceptors, and from interceptors to applications. In some embodiments, method 300 may include receiving, at container administrators, success responses or rejection responses and sending corresponding notifications to applications via interceptors that requested privileged operations are successfully completed or rejected. The systems described herein may perform step 318 in a variety of ways. For example, container administrator 123 may, as part of server 206 in FIG. 2, receive a success response and send, via interceptor 124, a notification to application 122 that a requested privileged operation is successfully completed. In another example, container administrator 123 may, as part of server 206 in FIG. 2, receive a failed response and send, via interceptor 124, a notification to application 122 that a requested privileged operation is rejected. In examples, from the perspective of application 122, method 300 appears transparent to application 122.

In additional embodiments, method 300 may include displaying, on user displays, error messages when requested privileged operations fails to successfully execute. For example, initiating module 110 may, as part of server 206 in FIG. 2, initiate displaying, on a user display, an error message when a requested privileged operation fails to successfully execute.

As detailed above, the steps outlined in method 300 in FIG. 3 may provide an ambassador-pattern-like extension to container implementation software by adding application-specific functionality that mediates required privileged operations of applications and reduces security risks that result from privileged container models. By doing so, the systems and methods described herein may enable safe multi-tenant application orchestration that enables applications to run at full capability, without acquiring root-equivalent privileges, in non-privileged containers on multi-tenant container platforms.

FIG. 4 is a block diagram of an example of a multi-tenant computing system 400. As shown in FIG. 4, multi-tenant computing system 400 may include a container host computing device 402 providing a non-privileged application container 404. In one example, all or a portion of the functionality of modules 102 may be performed by container host computing device 402. Container host computing device 402 generally represents any type or form of computing device that is capable of running applications, such as application one 406 and application two 408 on a multi-tenant container platform. Additional examples of container host computing device 402 include, without limitation, storage servers, database servers, application servers, and/or web servers configured to run certain software applications and/or provide various storage, database, and/or web services. Although illustrated as a single entity in FIG. 4, container host computing device 402 may include and/or represent a plurality of servers that work and/or operate in conjunction with one another. In examples, container host computing device 402 may provide a cloud-computing computing environment that may facilitate multi-tenancy. One or more of the modules described herein may also partition data and/or configuration information of a multi-tenant application for each customer such that one customer cannot access data and/or configuration information of another customer. For example, container host computing device 402 may enable user one 410 and user two 412 to share application two 408, while enabling only user one 410 to use application one 406. In some embodiments, one or more of modules described herein may program container host computing device 402 to enable application two 408 to perform system administration operations in non-privileged application container 404 without detrimentally affecting application one 406. This enables application one 406 and application two 408 to run at full capability, without acquiring root-equivalent privileges, in non-privileged container 404 on container host computing device 402.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for running applications on a multi-tenant container platform, at least a portion of the method being performed by a container host computing device comprising at least one processor, the method comprising:
   initiating, by an application running in a non-privileged container, a request for a privileged operation;
   invoking an interceptor when the requested privileged operation must be sent to a host administrator service;
   performing, by the interceptor, a whitelist check of the request;
   calling, by the interceptor when the whitelist check succeeds, a container administrator;

initiating, by the container administrator, using a host administrator service socket handle, a connection between the container administrator and the host administrator service when conditions are met for a requested privileged operation; and sending a request to a container host administrator service with details of the requested operation;

receiving, at the host administrator service on the container host computing device and via the host administrator service socket handle, a request for the privileged operation from the application running in the non-privileged container;

performing a security check of a user associated with the application, wherein performing the security check further comprises issuing the security check results of approval when the user identifier indicates a root user;

comparing, when the security check results in approval, a process identifier of the requested privileged operation against a whitelist of permitted operations to determine if the requested privileged operation from the application running in the non-privileged container is permissible; and initiating running, when the requested privileged operation is permissible, the requested privileged operation; and sending, when the requested privileged operation is successfully completed or rejected, a respective response to a container administrator;

wherein the interceptor provides application-specific library interposition to selectively handle system calls that require privilege and intermediation to mediate required privileged operations of applications to reduce security risks of privileged container models.

2. The computer-implemented method of claim 1, further comprising:
passing the host administrator service socket handle from the container host administrator service to the container.

3. The computer-implemented method of claim 1, further comprising:
receiving, at an interceptor, a success response; and
sending a notification to the application that the requested privileged operation is successful.

4. The computer-implemented method of claim 1, further comprising:
displaying, on a user display, an error message when the requested privileged operation fails to successfully execute.

5. The computer-implemented method of claim 1, wherein the non-privileged container does not include an entire operating system and the non-privileged container executes only the application running in the non-privileged container.

6. A system for running applications on a multi-tenant container platform, the system comprising:
an interceptor module that:
receives the request from the application when the application requests a privileged operation that must be sent to a host administrator service;
performs a whitelist check of the request; and
calls, when the whitelist check succeeds, a container administrator module; and
the container administrator module:
initiates, using a host administrator service socket handle, a connection between the container administrator module and the host administrator service when conditions are met for a requested operation; and
sends a request to the container host administrator service with details of the requested operation;

a receiving module, stored in memory, that receives, at a container host administrator service on a container host computing device and via a host administrator service socket handle, a request for a privileged operation from an application running in a non-privileged container;

a performing module, stored in the memory, that performs a security check of a user associated with the application, wherein performing the security check further comprises issuing the security check results of approval when the user identifier indicates a root user;

a comparing module, stored in the memory, that compares, when the security check results in approval, a process identifier of the requested privileged operation against a whitelist of permitted operations to determine if the requested privileged operation from the application running in the non-privileged container is permissible;

an initiating module, stored in the memory, that initiates running, when the requested privileged operation is permissible, the requested privileged operation; and at least one physical processor that executes the receiving module, the performing module, the comparing module, and the initiating module;

wherein an ambassador-pattern-like extension to container implementation software is provided by adding an application-specific functionality mediating required privileged operations of applications to reduce security risks that result from privileged container models;

wherein the interceptor provides application-specific library interposition to selectively handle system calls that require privilege and intermediation to mediate required privileged operations of applications to reduce security risks of privileged container models.

7. The system of claim 6, wherein the container host administrator service passes the host administrator service socket handle to the container.

8. The system of claim 6, wherein the initiating module sends, when the requested privileged operation is successfully completed or rejected, a respective response to a container administrator module.

9. The system of claim 6, further comprising an interceptor module that:
receives a success response; and
sends a notification to the application that the requested privileged operation is successful.

10. The system of claim 6, wherein the initiating module displays, on a user display, an error message when the requested privileged operation fails to successfully execute.

11. A non-transitory computer-readable medium comprising one or more computer-executable instructions that, when executed by at least one processor of a computing device, cause the computing device to:
receive, at an interceptor, the request from the application when the application requests a privileged operation that must be sent to a host administrator service;
perform, by the interceptor, a whitelist check of the request;
call, by the interceptor when the whitelist check succeeds, a container administrator;
initiate, by the container administrator, using a host administrator service socket handle, a connection between the container administrator and the container host administrator service when conditions are met for a requested operation; and send a request to the container host administrator service with details of the requested operation;

receive, at a host administrator service on a container host computing device and via a host administrator service socket handle, a request for a privileged operation from an application running in a non-privileged container;

perform a security check of a user associated with the application, wherein performing the security check further comprises issuing the security check results of approval when the user identifier indicates a root user;

compare, when the security check results in approval, a process identifier of the requested privileged operation against a whitelist of permitted operations to determine if the requested privileged operation from the application running in the non-privileged container is permissible; and initiate running, when the requested privileged operation is permissible, the requested privileged operation;

send, when the requested privileged operation is successfully completed or rejected, a respective response to a container administrator;

wherein an ambassador-pattern-like extension to container implementation software is provided by adding an application-specific functionality mediating required privileged operations of applications to reduce security risks that result from privileged container models;

wherein the interceptor provides application-specific library interposition to selectively handle system calls that require privilege and intermediation to mediate required privileged operations of applications to reduce security risks of privileged container models.

12. The non-transitory computer-readable medium of claim 11, wherein the computer-executable instructions comprise computer-executable instructions that cause the computing device to:

pass the host administrator service socket handle from the container host administrator service to the container.

13. The non-transitory computer-readable medium of claim 11, wherein the computer-executable instructions comprise computer-executable instructions that cause the computing device to send, when the requested privileged operation is successfully completed or rejected, a respective response to a container administrator.

14. The non-transitory computer-readable medium of claim 11, wherein the computer-executable instructions comprise computer-executable instructions that cause the computing device to:

receive, at an interceptor, a success response; and send a notification to the application that the requested privileged operation is successful.

\* \* \* \* \*